United States Patent
Gardo et al.

(10) Patent No.: US 7,602,706 B1
(45) Date of Patent: Oct. 13, 2009

(54) INTER-RING PROTECTION FOR SHARED PACKET RINGS

(75) Inventors: Russell Gardo, Raleigh, NC (US); Praveen Bhagwatula, Rohnert Park, CA (US); Jimmy Ervin, Raleigh, NC (US); Charles Allen Carriker, Cary, NC (US); James Scott Alexander, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 884 days.

(21) Appl. No.: 10/438,396

(22) Filed: May 15, 2003

(51) Int. Cl.
*G01R 31/08* (2006.01)
*H04L 12/28* (2006.01)

(52) U.S. Cl. .................. 370/219; 370/222; 370/405

(58) Field of Classification Search .............. 370/255, 370/256, 216–228, 250, 252, 404–406, 244, 370/229, 403
See application file for complete search history.

(56) References Cited

U.S. PATENT DOCUMENTS

| | | | |
|---|---|---|---|
| 4,683,563 A * | 7/1987 | Rouse et al. ............. 370/224 |
| 5,761,435 A | 6/1998 | Fukuda et al. ......... 395/200.68 |
| 5,859,959 A | 1/1999 | Kimball et al. ........ 395/182.02 |
| 6,304,575 B1 | 10/2001 | Carroll et al. ............... 370/408 |
| 6,639,893 B1 * | 10/2003 | Chikenji et al. ............. 370/217 |
| 6,658,013 B1 * | 12/2003 | de Boer et al. .............. 370/404 |
| 6,766,482 B1 * | 7/2004 | Yip et al. .................... 714/717 |
| 7,054,264 B2 * | 5/2006 | Mor .......................... 370/223 |
| 2002/0023170 A1 * | 2/2002 | Seaman et al. .............. 709/235 |
| 2003/0118041 A1 * | 6/2003 | Fontana et al. ............. 370/404 |
| 2003/0165119 A1 * | 9/2003 | Hsu et al. ................... 370/258 |
| 2004/0203976 A1 * | 10/2004 | Gupta et al. ................ 455/517 |

\* cited by examiner

*Primary Examiner*—Kevin C Harper
*Assistant Examiner*—Christine Duong
(74) *Attorney, Agent, or Firm*—Cindy Kaplan

(57) ABSTRACT

A method for providing inter-ring protection in shared packet rings includes identifying an active node which is connected to a ring interconnect node on the same ring as the active node and connected to a peer node on a different ring with a ring interconnecting link. When the active node is in active mode and receives notification of a failure of the ring interconnecting link or peer node, the active node sends a message to the ring interconnect node so that the ring interconnect node switches from standby mode to active mode. The active node is then changed to standby mode.

17 Claims, 6 Drawing Sheets

INTER-RING PROTECTION FOR SHARED PACKET RINGS

BACKGROUND OF THE INVENTION

The present invention relates generally to communication networks, and more specifically, to inter-ring protection for shared packet rings.

Spanning-Tree Protocol (STP) is a Layer 2 protocol designed to run on bridges and switches. The STP specification is defined in IEEE 802.1d. The main goal of STP is to make sure that a loop situation does not occur when there are redundant paths in a network. STP accomplishes this by disabling network loops and providing backup links between switches or bridges. STP allows devices to interact with other STP compliant devices in the network to ensure that only one path exists between any two stations on the network. If STP or a similar protocol is not present in a redundant topology network, switches may endlessly flood broadcast packets to all ports (i.e., broadcast storm). When multiple copies of a frame arrive at different ports of a switch, MAC entry instability in a Filtering Database may occur.

STP, RSTP (Rapid Spanning Tree Protocol) (defined in IEEE 802.1W), and other topology discovery protocols provide interconnection of two shared packet rings, however, they do not always provide sub-second convergence during failure.

There is, therefore, a need for a mechanism to interconnect two shared packet rings with redundant interconnect nodes which provide optimal bandwidth across rings and sub-second recovery for link or node failures.

SUMMARY OF THE INVENTION

A method for providing inter-ring protection in shared packet rings includes identifying an active node which is connected to a ring interconnect node on the same ring as the active node and connected to a peer node on a different ring with a ring interconnecting link. When the active node is in active mode and receives notification of a failure of the ring interconnecting link or peer node, the active node sends a message to the ring interconnect node so that the ring interconnect node switches from standby mode to active mode. The active node is then changed to standby mode.

In one embodiment, the active node is identified using RSTP. The active node preferably only adds or removes packets to or from the ring when it is in active mode. The active node may enter a flush state prior to entering standby mode to flush any packets which are in process when the node transitions from active to standby mode. During flush state, packets that were put onto the ring by the active node are removed. The ring interconnect link preferably has the same bandwidth as the ring of the active node and peer node.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. The network may be a packet based optical network that uses Ethernet data layer at speeds of 10 Gb/s (or above or below 10 Gb/s), both over high speed point-to-point circuits (i.e., dark fiber) and over WDM. However, it is to be understood that the system may be used with media types different than those described herein, without departing from the scope of the invention. A network element may be, for example, a terminal multiplexer, an add-drop multiplexer (ADM), an optical crossconnect (OXC), a signal regenerator, router, switch, or other optical node interface.

A system and method of the present invention provide interconnection between two shared packet rings with redundant interconnect nodes which generally provide optimal bandwidth across rings and sub-second recovery for link or node failures.

Figure 1:
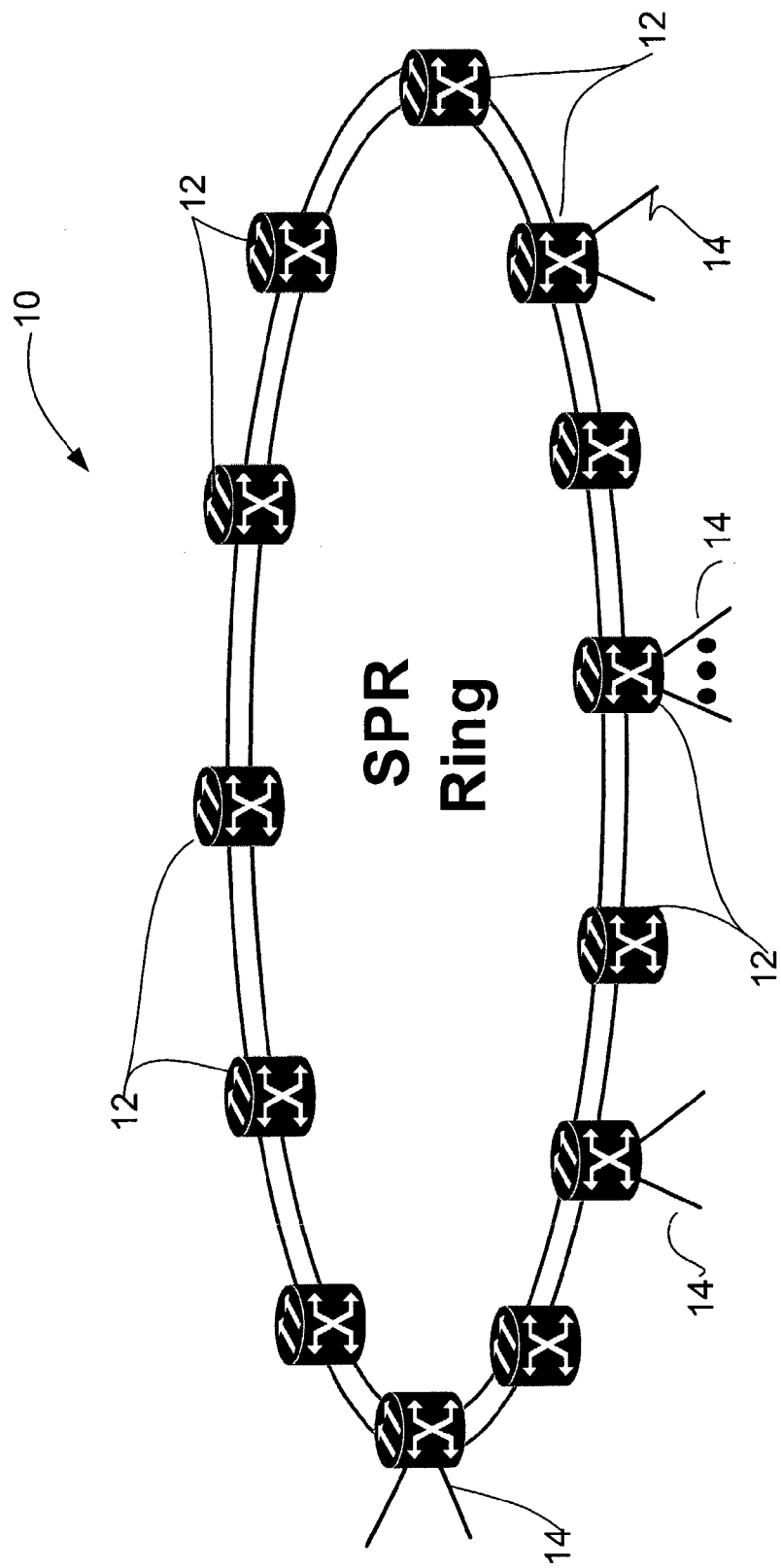
FIG. 1 is a diagram illustrating an exemplary shared packet ring.

FIG. 1 illustrates an exemplary shared packet ring 10. The ring 10 is made up of two or more nodes 12 (thirteen shown) attached with point-to-point connections to form a circle. The primary path is shown connecting adjacent nodes 12. Each node 12 has two connections, one to each adjacent node on the ring 10. A node is defined herein as an attachment point on the ring where packets are added, removed, passed, or forwarded. A node may be, for example, a network bridge, router, or other such device. A single connection between two nodes where the state of connection is known is a point-to-point connection. At least some of the nodes 12 on the ring 10 include add/drop interfaces 14.

Figure 2:
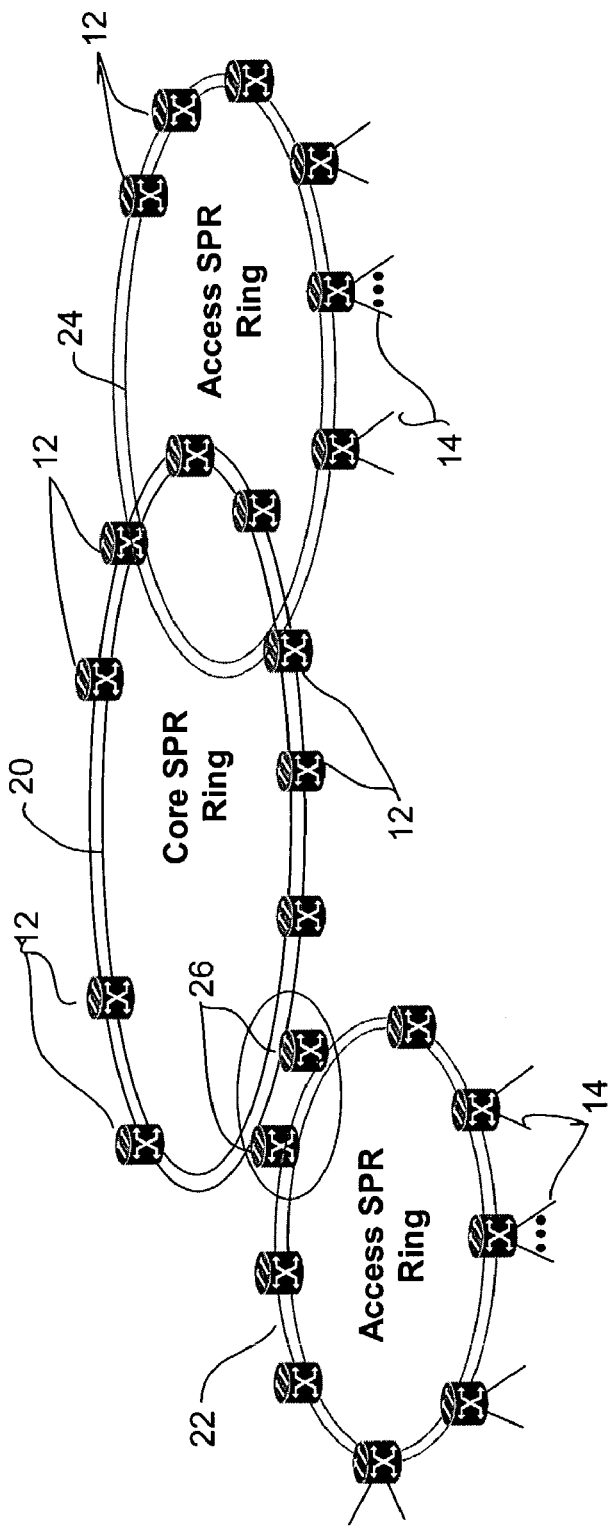
FIG. 2 is a diagram illustrating a core shared packet ring connected to two access shared packet rings.

As described in detail below, the system may be used where two nodes from one ring connect to two nodes from another ring and the shared packet ring technology utilizes a type of node ID to identify each node on the ring. For example, FIG. 2 shows a core shared packet ring 20 interconnected with two access shared packet rings 22, 24. Each ring includes a plurality of nodes 12 with at least some of the nodes having add/drop interfaces 14. Since only active nodes add or remove packets to or from the ring and a node does not forward a packet onto the same ring from which it received the packet, loops do not occur between rings.

Figure 3:
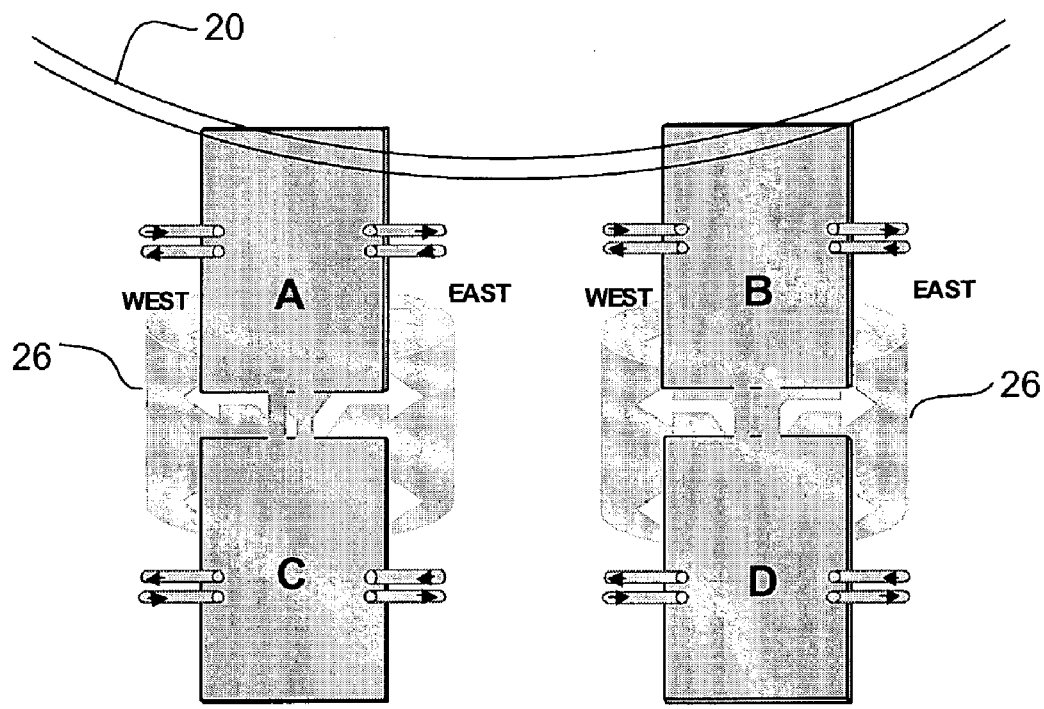
FIG. 3 is a diagram illustrating details of two devices of the rings of FIG. 2.

FIG. 3 illustrates details of two interconnect nodes 26 of FIG. 2. The interconnect nodes 26 are shown in FIG. 2 with a circle drawn around the nodes. As shown in FIG. 3, each interconnect node 26 includes a pair of cards, each having west ingress and egress ports and east ingress and egress ports. For purpose of explanation, the cards on one node are labeled A and C and the cards on the other node are labeled B and D. One pair of cards (A and C or B and D) is considered the active pair. The other is the standby pair. Cards A and B have the same SPR node ID and cards C and D have the same SPR node ID. As described in detail below, active link, node, or card failures cause a switchover to back up to occur.

As discussed above, the system described herein uses an active/standby model, where both interconnect nodes operate as one entity on the ring, with one of the nodes being active while the other is operating in standby mode. Control messages are exchanged among the ring-interconnect nodes during link or node failures for faster convergence. The state set by these messages takes precedence over the state set by RSTP running on these nodes. RSTP is only used to determine the initial active and standby states of the ring-interconnect nodes and also provide additional reliability for convergence in case the control messages are not delivered.

Ring packet headers are replaced when a packet traverses the interconnect nodes 26 of two rings. The system is thus decoupled from any specific shared packet ring mechanism. Furthermore, flushing of learned entries is not required in the interconnect nodes for ring-interconnect failures because these entries do not become invalid when the node that was active becomes the standby node. Learned entries do not become invalid in regular nodes (i.e., nodes that are not interconnect nodes) because both interconnect nodes act as a single entity on the ring. The interconnect nodes do not have to be adjacent on the ring. Regular nodes may reside between them.

Figure 4:
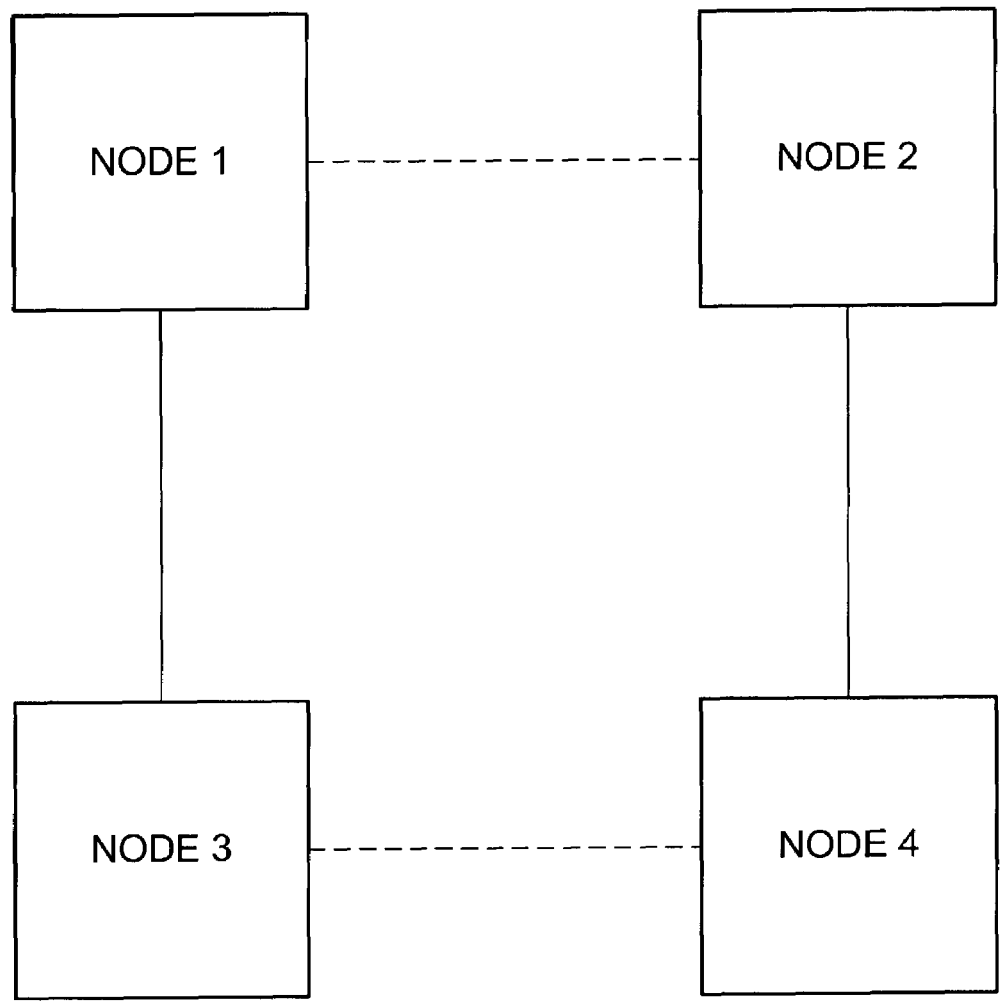
FIG. 4 is a block diagram showing four ring-interconnect nodes.

FIG. 4 is a block diagram illustrating a ring-interconnect which is used in the following example. Nodes 1 and 3 are on the same ring and are ring-interconnect nodes. Nodes 2 and 4 are on the same ring and are also ring-interconnect nodes. The ring-interconnect link preferably has the same bandwidth as that of the rings it interconnects so that the ring-interconnect link can carry full ring bandwidth of traffic between the rings. In the diagram of FIG. 4, the ring-interconnect links are node 1-to-node 2 and node 3-to-node 4. The node ID used on node 1 and node 3 is the same. Also, node 2 and node 4 share the same node ID. RSTP parameters are configured such that one of the ring-interconnect links is a blocking link.

The following describes the logic used to determine which nodes are active and which are standby. A node is active when its interconnect link is up and forwarding, its link onto the local ring is up and forwarding, and its ring-interconnect peer has no blocked ports. A node is in standby mode when its ring-interconnect link is down or blocked, its link onto the local ring is down or blocked, or when its ring interconnect peer has blocked ports.

When a node is in standby mode it does not add or remove any packets from the ring. It merely transmits all packets it receives from one side of the ring to the other. When a node transitions from active to standby, it goes through a flush state for a short time. The flush state is needed to flush any packets that are in process when a node transitions from active to standby mode. The reason that this is needed is because both interconnect nodes can be in standby mode for brief periods of time. In the flush state, the node removes any packets that it put onto the ring and does not add new packets to the ring (i.e., packets received from the other ring).

To avoid duplication of packets during transient states, where both the nodes on the ring are in standby mode, the ring header that is added to the packet includes a field that identifies which physical node added the packet to the ring. If the packet goes around the ring and comes back to the node that physically added it to the ring, the packet is removed from the ring.

Figure 5:
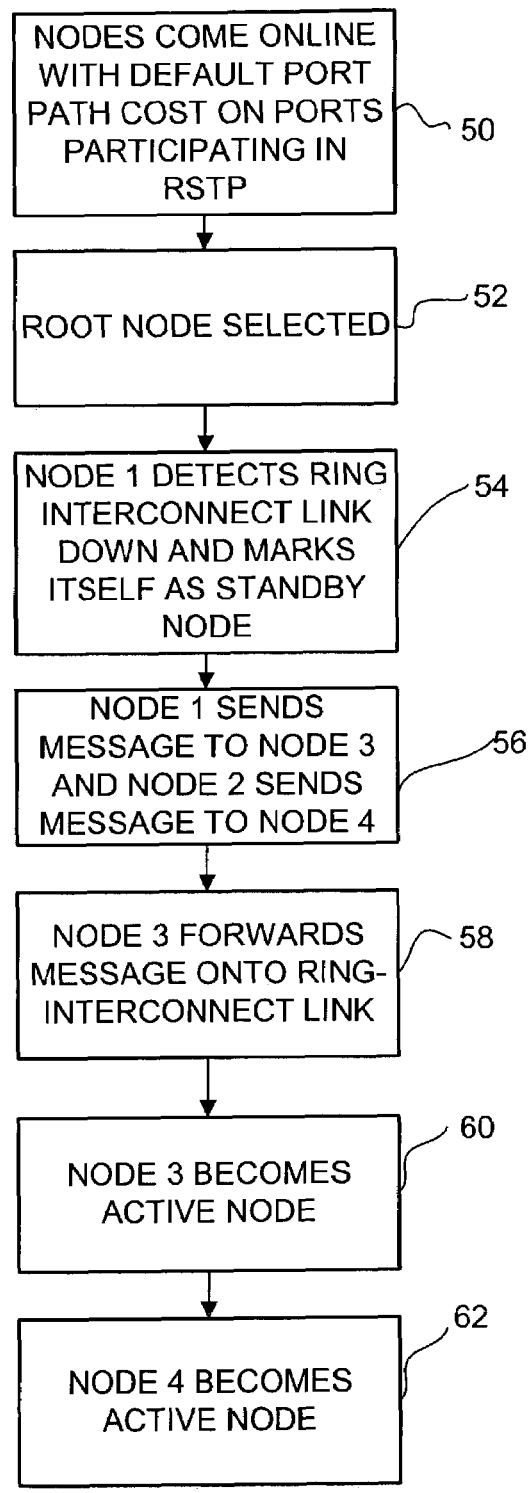
FIG. 5 is a flowchart illustrating a process for switching to backup upon an active link, node or card failure.

Each node has two RSTP port path costs: 1) default port path cost; and 2) standby port path cost. Default port path cost has a lower path cost than the standby port path cost. When either a port goes to blocking or the link goes down, the following process (shown in flowchart of FIG. 5) is performed to provide a rapid recovery.

Each node comes online with the default port path cost on all of the ports participating in RSTP (step 50). RSTP is run among the four ring-interconnect nodes (e.g., nodes 1, 2, 3, 4 of FIG. 4) to elect one of the nodes as a root node and block one of the ring links (step 52). Two of the nodes that satisfy the criteria for active nodes become the active nodes. For example, if node 1 is the root node, nodes 1 and 2 are the active nodes on their rings. The node which has a blocked port and its ring-interconnect peer are the standby nodes (e.g., nodes 3 and 4). The port path cost of the blocked port is changed to the standby port path cost.

When node 1 detects that its ring-interconnect link has gone down it marks itself as the standby node (step 54). A special message is sent to node 3. Similarly, when node 2 detects that its ring-interconnect link has gone down, it sets the port path cost of the failed link to standby port path cost so it is an unpreferred path, marks itself as a standby node, and sends a special message to node 4 (step 56). Upon receiving the message at node 3 from its peer on the same ring, the node forwards a copy of the message onto its ring-interconnect link (step 58). Node 3 also marks itself as the active node on that ring and promotes the port path cost of its blocked port to default port path cost and marks it as forwarding (step 60). Upon receiving the message from its ring-interconnect peer node 3, node 4 marks its ring-interconnect link as forwarding and marks itself as the active node (step 62).

When a node detects that its ring-interconnect link is restored, no specific action needs to be taken. Since the port path cost of this link has been set to the standby port path cost, making it an unpreferred path, spanning tree retains its topology, and nodes 1 and 2 remain as the standby nodes, while 3 and 4 continue to be the active nodes. Thus, the active nodes do not change during a link restore scenario and there is no traffic hit.

Figure 6:
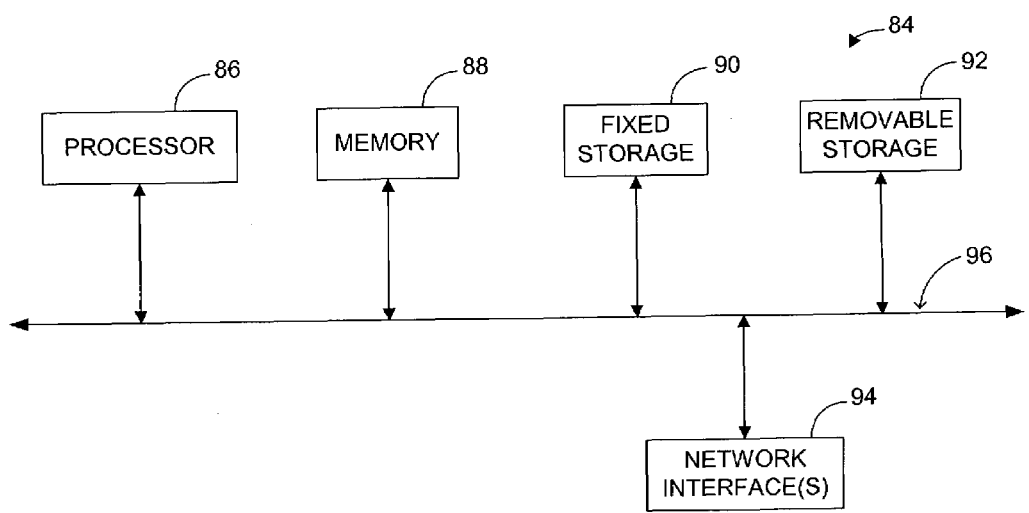
FIG. 6 is a system block diagram of a computer system that can be utilized to execute software of an embodiment of the present invention.

The invention described herein may be implemented in dedicated hardware, microcode, software, or photonic (optical) logic. FIG. 6 shows a system block diagram of computer system 84 that may be used as a router or host or used to execute software of an embodiment of the invention. The computer system 84 includes memory 88 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 84 further includes subsystems such as a central processor 86, fixed storage 90 (e.g., hard drive), removable storage 92 (e.g., CD-ROM drive), and one or more network interfaces 94. Other computer systems suitable for use with the invention may include additional or fewer subsystems. For example, computer system 84 may include more than one processor 86 (i.e., a multi-processor system) or a cache memory.

The system bus architecture of computer system 84 is represented by arrows 96 in FIG. 6. However, these arrows are only illustrative of one possible interconnection scheme serving to link the subsystems. For example, a local bus may be utilized to connect the central processor 86 to the system memory 88. Computer system 84 shown in FIG. 6 is only one example of a computer system suitable for use with the invention. Other computer architectures having different configurations of subsystems may also be utilized. Communication between computers within the network is made possible with the use of communication protocols, which govern how computers exchange information over a network.

As can be observed from the foregoing, the system described herein provides numerous advantages. For example, spanning tree protocol needs to be run only among the ring-interconnect nodes. Also, sub-second convergence during link or node failures is provided along with zero packet loss during link restore or node recovery scenarios. The system does not require any periodic, intensive protocol among the ring-interconnect nodes for synchronization.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for providing inter-ring protection in shared packet rings, the method comprising:
    utilizing a spanning tree protocol to identify a first node as a root node;
    operating the first node in an active mode, the first node connected to a ring interconnect node on the same ring as the first node and to a peer node on a different ring, the ring interconnect node in a standby mode, the first node configured to exchange control messages with the ring interconnect node during a failure of the peer node or a ring interconnecting link connecting the first node to the peer node;
    forwarding packets from the first node to the peer node on the ring interconnecting link in the active mode;
    receiving at the first node, notification of a failure of the ring interconnecting link or the peer node; and
    in response to said notification of a failure:
        sending said control message from the first node to the ring interconnect node instructing the ring interconnect node to switch from the standby mode to the active mode, wherein the ring interconnect node forwards packets in the active mode; and
        changing the first node to the standby mode and changing a port path cost of the first mode from a default port path cost associated with the active mode to a standby port path cost associated with the standby mode;
    wherein packets received at the first node or the ring interconnect node are blocked from being forwarded to said different ring when the node is in the standby mode.

2. The method of claim 1 wherein sending said control message from the first node to the ring interconnect node comprises changing the status of a ring interconnect link of the ring interconnect node from blocked to forwarding.

3. The method of claim 1 further comprising receiving a message at the first node that the failed link or node is restored and wherein the first node and ring interconnect node remain in their same modes when the failed link or node is restored.

4. A method for providing inter-ring protection in shared packet rings, the method comprising:
    utilizing a spanning tree protocol to identify a first node as a root node;
    operating the first node in an active mode, the first node connected to a ring interconnect node on the same ring as the first node and to a peer node on a different ring, the ring interconnect node in a standby mode, the first node configured to exchange control messages with the ring interconnect node during a failure of the peer node or a ring interconnecting link connecting the first node to the peer node;
    forwarding packets from the first node to the peer node on a ring interconnecting link in the active mode;
    receiving at the first node, notification of a failure of the ring interconnecting link or the peer node; and
    in response to said notification of a failure:
        sending said control message from the first node to the ring interconnect node instructing the ring interconnect node to switch from the standby mode to the active mode;
        changing the first node to the standby mode; and
        changing the first node to a flush state wherein packets that are in process at the first node are removed and packets received at the first node from said different ring are not added to the ring, prior to entering the standby mode;
    wherein packets received at the first node or the ring interconnect node are blocked from being forwarded to said different ring when the node is in the standby mode.

5. The method of claim 1 wherein the ring interconnecting link has generally the same bandwidth as the ring of the first node.

6. A computer program product for preventing loops in a ring topology of a computer network, the product comprising:
    code that utilizes a spanning tree protocol to identify a first node as a root node;
    code that operates the first node in an active mode, the first node connected to a ring interconnect node on the same ring as the first node and to a peer node on a different ring, the ring interconnect node in a standby mode, the first node configured to exchange control messages with the ring interconnect node during a failure of the peer node or a ring interconnecting link connecting the first node to the peer node;
    code that forwards packets from the first node to the peer node on a ring interconnecting link in the active mode;
    code that receives notification of a failure of the ring interconnecting link or the peer node;
    code that in response to said notification of a failure:
        sends said control message from the first node to the ring interconnect node instructing the ring interconnect node to switch from the standby mode to the active mode, wherein the ring interconnected node forwards packets in the active mode;
        changes the first node to said standby mode, and changes a port path cost of the first node from a default port path cost associated with the active mode to a standby port path cost associated with the standby mode; and
    a computer-readable storage medium for storing the codes;
    wherein packets received at the first node or the ring interconnect node are blocked from being forwarded to said different ring when the node is in the standby mode.

7. The product of claim 6 further comprising code that receives a message at the first node that the failed link or node is restored and wherein the first node and ring interconnect node remain in their same modes when the failed link or node is restored.

8. A computer program product for preventing loops in a ring topology of a computer network, the product comprising:
    code that utilizes a spanning tree protocol to identify a first node as a root node;

code that operates the first node in an active mode, the first node connected to a ring interconnect node on the same ring as the first node and to a peer node on a different ring, the ring interconnect node in a standby mode, the first node configured to exchange control messages with the ring interconnect node during a failure of the peer node or a ring interconnecting link connecting the first node to the peer node;

code that forwards packets from the first node to the peer node on a ring interconnecting link in the active mode;

code that receives notification of a failure of the ring interconnecting link or the peer node;

code that in response to said notification failure:
    sends said control message from the first node to the ring interconnect node instructing the ring interconnect node to switch from the standby mode to the active mode; and
    changes the first node to said standby mode;

code that changes the first node to a flush state wherein packets that are in process at the first node are removed and packets received at the first node from said different ring are not added to the ring, prior to entering the standby mode; and a computer-readable storage medium for storing the codes;

wherein packets received at the first node or the ring interconnect node are blocked from being forwarded to said different ring when the node is in the standby mode.

9. The product of claim 6 wherein the ring interconnecting link has generally the same bandwidth as the ring of the first node.

10. An apparatus for providing inter-ring protection in shared packet rings, comprising:

a processor configured to utilize a spanning tree protocol to identify a first node as a root node, operate the first node in an active mode or a standby mode, and switch the first node between said active and standby modes, the first node configured for connection to a ring interconnect node on the same ring as the first node and for connection to a peer node on a different ring with a ring interconnecting link, the first node configured to exchange control messages with the ring interconnect node during a failure of the peer node or a ring interconnecting link connecting the first node to the peer node; and a transmitter operable to send said control message from the first node to the ring interconnect node upon detection of a failure of the ring interconnecting link or the peer node instructing the ring interconnect node to switch from the standby mode to the active mode;

wherein only one of the first node and the ring interconnect node operate in the active mode at one time the first node and the ring interconnect node only add packets to the ring or remove packets from the ring when the node is in the active mode, and the processor is configured to change a port path cost of the first node upon switching the first node between said active and standby modes.

11. An apparatus for providing inter-ring protection in shared packet rings, comprising:

a processor configured to utilize a spanning tree protocol to identify a first node as a root node, operate the first node in an active mode or a standby mode, the first node configured for connection to a ring interconnect node on the same ring as the first node and for connection to a peer node on a different ring with a ring interconnecting link, the first node configured to exchange control messages with the ring interconnect node during a failure of the peer node or a ring interconnecting link connecting the first node to the peer node; and a transmitter operable to send said control message from the first node to the ring interconnect node upon detection of a failure of the ring interconnecting link or the peer node instructing the ring interconnect node to switch from the standby mode to the active mode;

wherein only one of the first node and the ring interconnect node operate in the active mode at one time and wherein the first node and the ring interconnect node only add packets to the ring or remove packets from the ring when the node is in the active mode, and the processor is configured to operate the first node in a flush state wherein packets that are in process at the first node are removed and packets received at the first node from said different ring are not added to the ring, prior to entering the standby mode.

12. The apparatus of claim 10 wherein the ring interconnecting link has generally the same bandwidth as the ring of the first node.

13. The apparatus of claim 10 wherein the spanning tree protocol is rapid spanning tree protocol.

14. The apparatus of claim 11 wherein a packet received at the apparatus includes a ring header comprising a field identifying a node that added the packet to the ring.

15. The method of claim 1 wherein a state set by said message sent to the ring interconnect node takes precedence over the state set by the spanning tree protocol running on the ring interconnect node.

16. The method of claim 1 wherein a state set at the first node by the spanning tree protocol identifies only an initial state of the first node and wherein said control messages exchanged between the first node and the ring interconnect node determine the state at the first node.

17. The method of claim 1 wherein changing the first node to the standby mode comprises setting the ring interconnecting link to a down or blocked state.

* * * * *

UNITED STATES PATENT AND TRADEMARK OFFICE
CERTIFICATE OF CORRECTION

PATENT NO. : 7,602,706 B1
APPLICATION NO. : 10/438396
DATED : October 13, 2009
INVENTOR(S) : Gardo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1552 days.

Signed and Sealed this

Fifth Day of October, 2010

David J. Kappos
*Director of the United States Patent and Trademark Office*